(12) United States Patent
Pan et al.

(10) Patent No.: US 10,370,475 B2
(45) Date of Patent: *Aug. 6, 2019

(54) ELASTOMERIC COMPOUNDS HAVING INCREASED COLD FLOW RESISTANCE AND METHODS PRODUCING THE SAME

(71) Applicant: Bridgestone Corporation, Chuo-ku (JP)

(72) Inventors: Xiao-Dong Pan, Houston, TX (US); Zengquan Qin, Copley, OH (US); Yuan-Yong Yan, Copley, OH (US)

(73) Assignee: Bridgestone Corporation, Chuo-ku (JP)

( * ) Notice: Subject to any disclaimer, the term of this patent is extended or adjusted under 35 U.S.C. 154(b) by 430 days.

This patent is subject to a terminal disclaimer.

(21) Appl. No.: 15/187,237

(22) Filed: Jun. 20, 2016

(65) Prior Publication Data

US 2016/0297913 A1 Oct. 13, 2016

Related U.S. Application Data

(62) Division of application No. 13/174,934, filed on Jul. 1, 2011, now Pat. No. 9,371,434.

(60) Provisional application No. 61/361,271, filed on Jul. 2, 2010.

(51) Int. Cl.
| | |
|---|---|
| *C08K 3/04* | (2006.01) |
| *C08K 5/00* | (2006.01) |
| *C08L 9/06* | (2006.01) |
| *C08K 5/098* | (2006.01) |
| *C08L 15/00* | (2006.01) |
| *C08L 21/00* | (2006.01) |
| *C08L 91/00* | (2006.01) |
| *C08L 91/06* | (2006.01) |
| *C08F 236/10* | (2006.01) |

(52) U.S. Cl.
CPC .............. *C08F 236/10* (2013.01); *C08K 3/04* (2013.01); *C08K 5/0091* (2013.01); *C08K 5/098* (2013.01); *C08L 91/00* (2013.01); *C08L 91/06* (2013.01)

(58) Field of Classification Search
CPC combination set(s) only.
See application file for complete search history.

(56) References Cited

U.S. PATENT DOCUMENTS

| | | | |
|---|---|---|---|
| 3,876,654 A | 4/1975 | Pattison | |
| 3,946,132 A | 3/1976 | Hadden | |
| 4,550,147 A | 10/1985 | Oohara | |
| 5,698,619 A | 12/1997 | Cohen | |
| 6,403,720 B1 | 6/2002 | Chino et al. | |
| 6,407,165 B1 | 6/2002 | Wang et al. | |
| 6,518,350 B1 | 2/2003 | Kobayashi | |
| 6,675,851 B1 | 1/2004 | Masson et al. | |
| 7,393,564 B2 | 7/2008 | Hergenrother | |
| 7,671,139 B1 | 3/2010 | Oziomek et al. | |
| 9,371,434 B2* | 6/2016 | Pan | C08K 5/0091 |
| 9,868,850 B2* | 1/2018 | Yan | C08C 19/44 |
| 2001/0009948 A1 | 7/2001 | Hopkins | |
| 2006/0128868 A1 | 6/2006 | Martler | |
| 2006/0264590 A1* | 11/2006 | Hogan | C08F 4/484 526/222 |
| 2006/0272760 A1 | 12/2006 | Teratani | |
| 2008/0027171 A1 | 1/2008 | Yan et al. | |
| 2009/0165913 A1 | 7/2009 | Hergenrother | |
| 2009/0209699 A1 | 8/2009 | Weinreich | |
| 2010/0286348 A1 | 11/2010 | Pan et al. | |
| 2012/0130009 A1* | 5/2012 | Qin | B60C 1/00 524/575 |
| 2013/0035437 A1* | 2/2013 | Pan | C08C 19/44 524/572 |
| 2015/0203662 A1* | 7/2015 | Yan | C08C 19/44 524/575 |
| 2018/0002490 A1* | 1/2018 | Yan | C08F 230/08 |
| 2018/0079891 A1* | 3/2018 | Yan | C08C 19/44 |

FOREIGN PATENT DOCUMENTS

| | | |
|---|---|---|
| EP | 875532 B1 | 10/2001 |
| EP | 1142950 A2 | 10/2001 |
| EP | 1339539 B1 | 1/2005 |
| EP | 1833686 B1 | 3/2009 |
| EP | 1697150 B1 | 4/2009 |
| WO | 2008156788 A2 | 12/2008 |
| WO | 2009049413 A1 | 4/2009 |
| WO | 2009086490 A2 | 7/2009 |

OTHER PUBLICATIONS

Sever, Mary J., et al., "Metal-Mediated Cross-Linking in the Generation of a Marine Mussel Adhesive," Angewandte Chemie Int'l Ed., vol. 43 p. 447-450 (2004).
Monahan, Jennifer et al., "Cross-Linking the Protein Precursor of Marine Mussel Adhesives: Bulk Measurements and Reagents for Curing," Langmuir 20, p. 3724-29 (2004).
Westwood, Glenn, et al., "Simplified Polymer Mimics of Cross-Linking Adhesive Proteins," Macromolecules, 40, p. 3960-64 (2007).
Non-final rejection from U.S. Appl. No. 13/174,934, dated Aug. 2013.
Response filed in U.S. Appl. No. 13/174,934 in Nov. 2013.
Final rejection from U.S. Appl. No. 13/174,934, dated Dec. 2013.
Response filed in U.S. Appl. No. 13/174,934 in May 2014.
Non-final rejection from U.S. Appl. No. 13/174,934, dated Jun. 2015.
Response filed in U.S. Appl. No. 13/174,934 in Sep. 2015.
Final rejection from U.S. Appl. No. 13/174,934, dated Oct. 2015.
Response filed in from U.S. Appl. No. 13/174,934 in Dec. 2015.

* cited by examiner

*Primary Examiner* — Liam J Heincer
(74) *Attorney, Agent, or Firm* — Meredith E. Hooker; Jenny L. Sheaffer

(57) ABSTRACT

Elastomeric compounds having increased cold flow resistance may be obtained by utilizing from 10-100 phr of a functionalized rubbery polymer containing specified types of functionalizing units, at least 0.01 phr of a multivalent metal organic salt and 0-90 phr of at least one additional rubbery polymer.

19 Claims, 1 Drawing Sheet

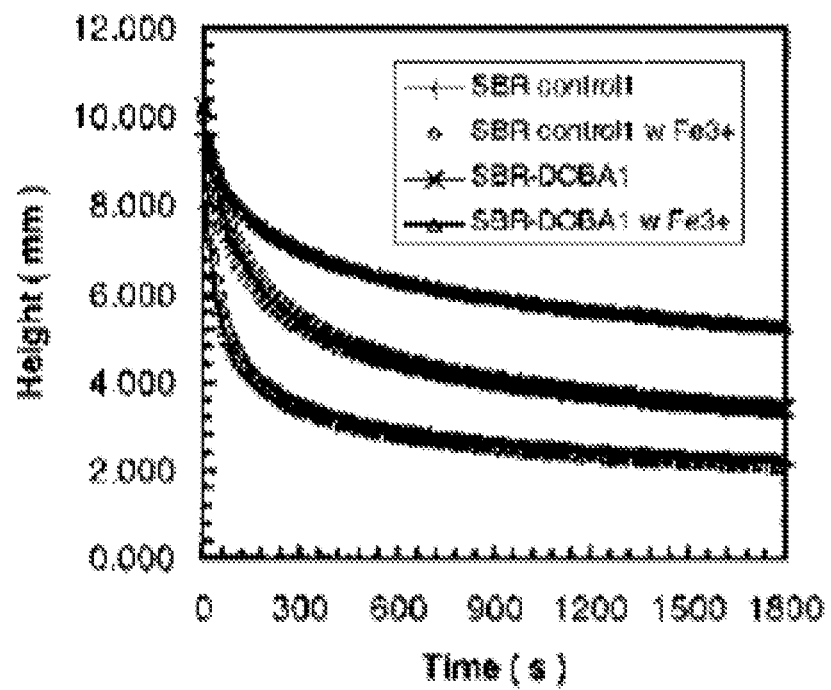
PLOT OF SCOTT TESTING HEIGHT VERSUS TIME

ELASTOMERIC COMPOUNDS HAVING INCREASED COLD FLOW RESISTANCE AND METHODS PRODUCING THE SAME

CROSS-REFERENCE TO RELATED APPLICATIONS

This application is a divisional of U.S. non-provisional application Ser. No. 13/174,934, filed Jul. 1, 2011, which claims priority to U.S. provisional application No. 61/361,271, filed Jul. 2, 2010, the entire disclosures of which are hereby incorporated by reference.

FIELD

One or more embodiments of the present application relate to elastomeric compounds including functionality that interacts with a multivalent metal organic salt additive, the functionality as specified herein.

BACKGROUND

In certain applications, it is advantageous for elastomeric compounds to exhibit increased resistance to cold flow, or creep, without involvement of permanent crosslinking via formation of intermolecular covalent bonding. In one non-limiting example, during the manufacturing process of various articles, including pneumatic tires, bales of elastomers are stored for various times and at various conditions, and are shipped to various locations for processing. It is advantageous for such elastomer bales to maintain their shape under self gravity.

SUMMARY

The addition of various metal organic salts to elastomeric compounds having certain functionality, as specified herein, results in desirable properties, including increased cold-flow resistance.

The present application describes elastomeric compounds having increased cold-flow resistance. The elastomeric compounds comprise from 10 to 100 parts by weight per hundred parts by weight rubber (phr) of a functionalized rubbery polymer with at least one functionalizing unit, at least 0.01 phr of a multivalent metal organic salt, and from 0 to 90 phr of at least one additional rubbery polymer. Generally, the functionalizing unit comprises an aryl group having at least one aromatic ring α bearing at least two directly-bonded OR groups, where each R is independently hydrogen or a hydrolyzable protecting group, with the proviso that at least 30% of the α groups are hydrolyzed.

In one or more embodiments, the present application further describes an elastomeric compound comprising from 10 to 100 phr of a rubbery polymer having at least one functionalized terminus with functionality defined by formulas (I), (IIa), and/or (IIb), below; at least 0.01 phr of a multivalent metal organic salt; and from 0 to 90 phr of at least one additional rubbery polymer.

Formulas (I), (IIa), and (IIb) are as follows

 (I)

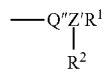 (IIa)

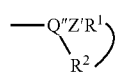 (IIb)

where $R^1$ comprises an aryl group having at least one aromatic ring α bearing at least two directly-bonded OR groups, where each R is independently hydrogen or a hydrolyzable protecting group ($R^4$, described below). At least 30% of the α groups are hydrolyzed.

With respect to formula (I), Q' is the residue of an initiating moiety (Q, discussed below) bonded to the polymer chain through a C, N or Sn atom, and Z is a single-bond, such that Q' and $R^1$ are directly bonded to one another. In addition Z may be an acyclic alkylene, cyclic alkylene, or arylene group.

With respect to formulas (IIa) and (IIb), Q" is the residue of a functionality that is reactive with carbanionic polymers but which itself is non-reactive toward such polymers, and Z' is a single bond, such that Q" and $R^1$ are directly bonded to one another, or Z' may be an alkylene group. Also, $R^2$ is hydrogen, an alkyl group, an aryl group, or $JR^0$, where J is O, S, or $NR^0$, and where each $R^0$ is independently an alkyl group. In addition, $R^2$ may optionally be linked to $R^1$ directly, or through one or more C atoms or heteroatoms.

In one or more embodiments, the present application further describes a method for preparing an elastomeric compound with increased cold-flow resistance, comprising the steps of providing a mixture comprising (i) from 10 to 100 phr of a functionalized rubbery polymer with at least one functionalizing unit and (ii) from 0 to 90 phr of at least one additional rubbery polymer, and adding at least 0.01 phr of a multivalent metal organic salt. The functionalizing unit comprises an aryl group having at least one aromatic ring α bearing at least two directly-bonded OR groups, and where each R is independently hydrogen or a hydrolyzable protecting group, with the proviso that at least 30% of the α groups are hydrolyzed.

Other aspects of this disclosure will be apparent to the ordinarily skilled artisan from the description of various embodiments that follows. In that description, the following definitions apply throughout unless the surrounding text explicitly indicates a contrary intention:

"polymer" means the polymerization product of one or more monomers and is inclusive of homo- and inter-polymers, and random, block, segmented, graft, etc., polymers, and the like;

"reactive polymer" means a polymer having at least one site which, because of the presence of an associated catalyst or initiator, readily reacts with other molecules, with the term being inclusive of, among other things, pseudo-living and carbanionic polymers;

"directly bonded" means covalently attached with no intervening atoms or groups;

"radical" and "residue" mean the portion of a molecule that remains after reacting with another molecule, regardless of whether any atoms are gained or lost as a result of the reaction.

Throughout this document, all values given in the form of percentages are weight percentages unless the surrounding text explicitly indicates a contrary intention. The relevant portions of any patent or patent publication mentioned is incorporated herein by reference.

BRIEF DESCRIPTION OF THE DRAWINGS

FIG. 1 is a graph illustrating the variation of the specimen height with time during the cold flow testing for the four polymers generated in Example 1. Within the graph, SBR control correlates to control 1 of Table 1, SBR control with Fe3+ correlates to SBR control of Table 2, SBR-DOBA1 correlates to Experimental 1 of Table 1 and SBR-DOBA1 with Fe3+ correlates to SBR-DOBA of Table 2.

DETAILED DESCRIPTION

Generally, according to one or more embodiments described in the present application, elastomeric compounds having increased cold flow resistance are provided by adding multivalent metal organic salt(s) to a functionalized rubbery polymer having at least one specified functionalizing unit pendent to the polymer at a chain terminus and/or along the chain backbone. "Increased cold flow resistance" is used herein to mean, with reference to the plastometer (Scott™ tester) protocol described in the examples below, a functionalized rubber polymer containing a multivalent metal organic salt that will produce a final sample height that is at least 5% greater than the final sample height of a control sample (i.e., the same functionalized rubbery polymer, but with no metal organic salt added). In certain embodiments, the increased final height from such cold flow resistance testing represents an improvement of at least 10%; in others at least 15%; in others at least 30%. In certain embodiments, the increased final height from such cold flow resistance testing represents an improvement of between 5-60%; in others between 10-55%; in others between 15-55%. The specified functionalizing unit comprises an aryl group having at least one aromatic ring α bearing at least two directly-bonded OR groups, where each R is independently hydrogen or a hydrolyzable protecting group ($R^4$, described below).

It has been discovered that when a multivalent metal organic salt is added to a functionalized rubbery polymer to form an elastomeric compound, such compounds exhibit increased cold flow resistance. Without wishing to be bound by any particular theory, it is believed that coordination interactions between the multivalent metal ions and the hydroxylated aryl groups of one or more polymer chains result in non-covalent coupling or crosslinking between or among the polymer chains, reducing creep or cold flow (the terms creep and cold flow are used interchangeably herein). Advantageously, the addition of metal organic salt has been found to have little or no negative impact on other properties of the elastomeric compound, including but not limited to further mixing with other ingredients and formation of covalent crosslinking via vulcanization. In addition, physical properties of rubber vulcanizates that incorporate the elastomeric compounds disclosed herein are also not materially impacted, including but not limited to the physical properties discussed in the examples below.

Generally, any multivalent metal organic salt providing increased cold flow resistance when mixed with a functionalized rubbery polymer may be used. Non-limiting examples of useful multivalent metal organic salts are organic salts of $Fe^{2+}$, $Fe^{3+}$, $Al^{3+}$, $Ca^{2+}$, $Mn^{2+}$, $Mn^{3+}$, $Mn^{4+}$, $Mn^{7+}$, $Co^{2+}$, $Ni^{2+}$, $Zn^{2+}$, $Cu^{2+}$, $Ga^{3+}$, $Zr^{4+}$, $Ti^{3+}$, $Ti^{4+}$, $Mg^{2+}$, $Cr^{2+}$, $Cr^{3+}$, $Cr^{6+}$, $V^{3+}$, $V^{4+}$, $V^{5+}$, $Sn^{2+}$, $Sn^{4+}$, and $Pt^{2+}$. Preferably, the metal organic salts are $Ca^{2+}$, $Al^{3+}$, $Mg^{2+}$, $Zn^{2+}$, $Zr^{4+}$, $Ti^{4+}$, $Fe^{2+}$, and $Fe^{3+}$ organic salts. Non-limiting examples of useful organic substituents are metal acetylacetonate compounds, metal carboxylate compounds, metal alkoxides, metal alkyls, and metal amides.

Generally, any amount of a multivalent metal organic salt that results in a desired increase in cold flow resistance may be used. In one non-limiting example, at least 0.01 phr of the metal organic salt is used; preferably at least 0.015 phr, even more preferably at least 0.02 phr is used. The upper limit on the amount of multivalent metal organic salt to be used may generally be the amount at which a sufficiently negative affect on elastomeric compound properties of interest (other than cold flow resistance), begins to appear. In one embodiment, the upper limit may be 12 phr. In another embodiment, the upper limit may be 10 phr; preferably 8 phr. In one or more embodiments, the amount of metal organic salt is between 0.01 and 12 phr; optionally between 0.015 and 10 phr; and optionally between 0.02 and 8 phr.

Without wishing to be bound by theory, and depending on the valence of the metal ion of the organic salt, it is believed that sufficient cold flow resistance is achieved when the molar ratio between the metal organic salt and the hydrolyzed functional units is from 1:16 to 2:1; optionally between 1:12 to 3:2; preferably between 1:8 to 4:3. The term "hydrolyzed functional units" means those functionalized groups that have been completely hydrolyzed—i.e., those aryl groups, having at least one aromatic ring α bearing at least two directly-bonded OR groups, wherein each OR group has been hydrolyzed.

The functionalized rubbery polymer may be prepared through the use of functionalizing initiators, functionalizing terminating compounds, and/or functional monomers in combination with anionic (living) or catalytic (pseudo-living) polymerization of various elastomeric monomers. General methods for preparing the functionalized rubbery polymer are well known to those of ordinary skill in the art.

Functionalizing initiators useful for preparing functionalized rubbery polymer (hereinafter referred to as "R-3 initiators") may generally be described by the formula

$$R^3ZQ\text{-}M \qquad (III)$$

where M is an alkali metal atom; preferably a K, Na or Li atom; most preferably a Li atom. Additionally, Z is a single-bond (such that Q and $R^3$ are directly bonded to one another), an acyclic or cyclic alkylene group, or an arylene group. If a group rather than a single bond, Z may be substituted or unsubstituted.

Generally, $R^3$ is a substituted or unsubstituted aryl group having at least two directly-bonded $OR^4$ groups, where each $R^4$ is independently a hydrolyzable protective group that is non-reactive toward M. The aryl group of $R^3$ may be a single aromatic ring or two or more fused aromatic rings. In one or more embodiments, $R^3$ comprises an aryl group having at least one aromatic ring α bearing at least two directly-bonded $OR^4$ groups. Optionally, $R^3$ comprises an aryl group having at least one aromatic ring α bearing between two and five directly-bonded $OR^4$ groups. Optionally, $R^3$ comprises an aryl group having at least one aromatic ring α bearing at least two $OR^4$ groups that are directly bonded to adjacent carbon atoms. More preferably, $R^3$ comprises a phenyl group having two $OR^4$ groups directly bonded at the 3 and 4 positions (which, when hydroxylated is a 3,4-dihydroxyphenyl group).

A hydrolyzable protecting group $R^4$ may generally be any group that is non-reactive in the types of conditions utilized when polymerizing ethylenically unsaturated monomers but which later may be removed, typically by hydrolysis or similar reaction, so as to provide the desired hydroxyl group(s). The particular type(s) of hydrolyzable protecting group(s) employed should not interfere with the polymerization process, and the de-protection process employed to provide hydroxyl groups should not destroy or otherwise react with any ethylenic unsaturation in the polymer. A non-limiting class of useful protecting groups is trialkylsiloxy groups (which may be provided by reacting hydroxyl groups with a trialkylsilyl halide), acetal, tert-butyl ether, 2-methoxyethoxy ether, and the like.

Also with respect to formula (III), Q is a group bonded to M through a C, N or Sn atom. Generally, Q does not contain any active hydrogen atoms which, as appreciated by the ordinarily skilled artisan, interfere with the efficacy of the R-3 initiator. Non-limiting examples of useful Q groups include thioacetals. Thioacetals have the general formula

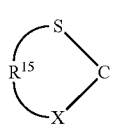

(IV)

where $R^{15}$ is a $C_2$-$C_{10}$ alkylene group, preferably a $C_2$-$C_8$ alkylene group, more preferably a $C_3$-$C_6$ group; X is selected from S, O and $NR^{16}$ wherein $R^{16}$ can be a $C_1$-$C_6$ trialkylsilyl group, a $C_1$-$C_{20}$ alkyl group, a $C_4$-$C_{20}$ cycloalkyl group, a $C_6$-$C_{20}$ aryl group with the proviso that any of the following can be attached: $C_1$-$C_{10}$ alkyl groups, $C_6$-$C_{20}$ aryl groups, $C_2$-$C_{10}$ alkenyl groups, $C_3$-$C_{10}$ non-terminal alkynyl groups, ethers, tert-amines, phosphines, sulfides, silyls, and mixtures thereof. One preferred species includes an S atom as X and a $C_3$ alkylene group as $R^{15}$, i.e., a 1,3-dithiane. In certain aspects, Q can be a group that includes a heteroatom-substituted cyclic moiety adapted to bond to an alkali metal atom, such as Li. Additional information is contained in U.S. Pat. No. 7,153,919.

Other non-limiting examples of useful Q groups include a variety of linear or branched alkyl groups (including butyl, pentyl, hexyl, heptyl, octyl, etc), $Sn(R^{17})_2$ where each $R^{17}$ is independently a hydrocarbyl (e.g., alkyl, cycloalkyl, aryl, aralkyl, alkaryl, etc.) group or, together, form a cycloalkyl group, and $NR^{18}$ where $R^{18}$ is a hydrocarbyl group, particularly an aryl, a $C_3$-$C_8$ cycloalkyl, or a $C_1$-$C_{20}$ alkyl group; included among the latter are cycloalkyleneiminoalkyl-lithium compounds such as those described in, for example, U.S. Pat. No. 5,574,109.

When an R-3 initiator is used to initiate polymerization, its radical forms one end of a polymer chain. Subsequent hydrolyzation (described below) results in a functionalizing unit represented by formula (I), above.

According to one or more embodiments of the present application, the functionalizing initiator may be used to anionically polymerize any anionically-polymerizable monomer, resulting in a functionalized rubbery polymer. The same types of monomers may be used to polymerize both the functionalized rubbery polymer and the at least one additional rubbery polymer present in the elastomeric compounds of the present application. Non-limiting examples of such monomers include polyenes (e.g., conjugated dienes) and vinyl aromatics.

Preferably, the polyenes include conjugated dienes. Preferable conjugated dienes include 1,3-butadiene, 1,3-pentadiene, 1,3-hexadiene, 2,3-dimethyl-1,3-butadiene, 2-ethyl-I,3-butadiene, 2-methyl-1,3-pentadiene, 3-methyl-I,3-pentadiene, isoprene, 4-methyl-1,3-pentadiene, 2,4-hexadiene, and the like. Even more preferably, the conjugated diene is 1,3-butadiene.

Preferably, the vinyl aromatics include the $C_6$-$C_{20}$ vinyl aromatics, including but not limited to styrene, α-methyl styrene, p-methyl styrene, the vinyl toluenes, and the vinyl naphthalenes.

In one or more embodiments, essentially all (i.e., at least 95%) of the polyene content of the functionalized rubbery polymer is a conjugated diene. Preferably, essentially all of the polyene content is 1,3-butadiene.

In one or more embodiments, the functionalized rubbery polymer includes both vinyl aromatic and conjugated diene monomers. Preferably, the vinyl aromatic content may be between 1 to 50 (wt.) %, from 10 to 45%, or from 20 to 40% of the rubbery polymer. Random microstructure may provide particular benefit in some end use applications such as, e.g., compositions used in the manufacture of tire treads. If block interpolymer content is desired, vinyl aromatic content may generally be from 1 to 90 (wt.) %, from 2 to 80%, from 3 to 75%, and typically from 5 to 70% of the functionalized rubbery polymer chain.

Polyenes may incorporate into polymeric chains in more than one way. Especially for tire tread applications, controlling this manner of incorporation is desirable. A polymer chain with an overall 1,2-microstructure, given as a numerical percentage based on total number of polyene units, of from 10 to 80%, optionally from 25 to 65%, can be desirable for certain end use applications. A polymer that has an overall 1,2-microstructure of no more than 50%, preferably no more than 45%, more preferably no more than 40%, even more preferably no more than 35%, and most preferably no more than 30%, based on total polyene content, is considered to be substantially linear. For certain end use applications, keeping the content of 1,2-linkages even lower, e.g., to less than about 7%, less than 5%, less than 2%, or less than 1%, can be desirable.

In certain embodiments, one or more functionalizing units of the functionalized rubbery polymer may be provided by using a monomer that, when incorporated into the polymer chain, results in the functionalizing unit described herein (hereinafter referred to as a "functional monomer"). Non-limiting examples of functional monomers include anionically-polymerizable monomers having at least one pendent aryl group which includes one or more directly bonded $OR^4$ groups, where each $R^4$ is independent and described above. Preferably, the at least one aryl group has at least one aromatic ring α bearing at least two directly-bonded $OR^4$ groups. Preferably, the at least one aryl group has at least one aromatic ring α bearing between two and five directly-bonded $OR^4$ groups. Preferably, the at least one aryl group has at least one aromatic ring α bearing at least two $OR^4$ groups that are directly bonded to adjacent carbon atoms. Preferably, the at least one aryl group comprises a phenyl group bearing two $OR^4$ groups directly bonded at the 3 and 4 positions (which, when hydroxylated is a 3,4-dihydroxyphenyl group).

In one or more preferred embodiments, the functional monomers disclosed herein are vinyl aromatic monomers having the general formula $$CH_2\!\!=\!\!CHR^3 \quad \text{or} \tag{Va}$$

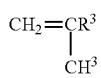

(Vb)

where $R^3$ is defined as above, and which preferably may include from two to five $OR^4$ groups. Preferably, each $R^4$ hydrolyzable protecting group is identical.

Referring to the functionalizing units generally, the number of OR groups on any one particular type of functionalizing unit described herein need not be the same as those on another type of functionalizing unit, and, where the number is the same, they need not be at the same position(s) on the aromatic ring(s) of the functional unit(s). Using a phenyl group as a representative aryl group, relative to the point of attachment of the phenyl group to the polymer chain, multiple OR groups may be provided 2,3-, 2,4-, 2,5-, 2,6-, 3,4-, 3,5-, 3,6-, 2,3,4-, 2,3,5-, etc., on the phenyl ring. Also generally, the OR groups may be substituents on the same aromatic ring or may be substituents on different rings and, where the aromatic ring(s) of the functionalizing unit(s) contain three or more OR groups, two of them may be substituents of one ring with the other(s) being substituent(s) of other ring(s). Where the aryl functionalizing unit is other than a phenyl group and includes more than one OR group and where the OR groups are on more than one ring, at least two of the OR groups are preferably proximate, i.e., directly bonded to ring C atoms that are separated by no more than 4, preferably 3, and even more preferably 2, other ring atoms.

The number of functional monomer units in the functionalized rubbery polymer is typically small relative to the number of non-functional monomer units (e.g., the conjugated diene and/or vinyl aromatic monomer units), since a relatively small number of functional monomer units has been found to provide a satisfactory level of desired properties, including increased cold-flow resistance, described below. This relatively small number may be expressed in a number of ways. For example, the weight percentage of the final polymer attributable to functional monomer units commonly is less than 2%, more commonly from 0.02 to 3.5%, and typically from 0.05 to 2.0%. The percentage of functional monomer units relative to the total number of monomer unit content in the polymer is commonly less than 2%, more commonly from 0.01 to 0.75%, and typically from 0.04 to 0.5%. Finally, the total number of functional monomer units in a given functionalized polymer generally is from 1 to several dozen, commonly from 1 to 12, more commonly from 1 to 10, and most commonly from 1 to 5.

The functional monomer units may be separated from one another, or two or more functional monomer units may be contiguous along the polymer chain. Further, the functional monomer units may be incorporated near the beginning of the polymerization, near the end of the polymerization, or at any one or more intermediate points; in the first two of the foregoing possibilities, a functional monomer unit may be provided within 6 chain atoms of, within 2 units of, or adjacent to a terminus of the polymer, or as a terminal unit, either alone or as part of a block.

In general, any suitable polymerization reaction method may be used to prepare the functionalized rubbery polymers and the at least one additional rubbery polymer. For example, solution polymerization or emulsion polymerization may be utilized. Also for example, anionic (living) polymerization and catalytic (pseudo-living) polymerization may be employed. Since the methods are generally known to one ordinarily skilled in the art, only certain aspects are provided here for convenience of reference.

Anionic polymerization typically involves an initiator. Exemplary initiators include organolithium compounds, particularly alkyllithium compounds. Multifunctional initiators, i.e., initiators capable of forming polymers with more than one living end, also may be used. Examples of any of the foregoing types of initiators are disclose in e.g., WO 2009086490.

Also, so-called functionalized initiators may be used. Such initiators become incorporated into the polymer chain, providing a functional group at the initiated end of the chain end. Examples of functional initiators may be found in e.g., U.S. Pat. Nos. 7,153,919, 5,153,159 and 5,567,815.

Initiators (including the R-3 initiator described above) generally may be pre-made external to the polymerization vessel where it is to act as an initiator, or may be synthesized in situ. Additional details of anionic solution polymerization are disclosed in e.g., WO 2009086490.

Certain end use applications call for polymers that have properties that can be difficult or inefficient to achieve via anionic polymerizations. For example, in some applications, highly stereospecific polydiene (e.g., high cis-1,4-polybutadiene) content can be desirable. Such polymers may be prepared by processes using catalysts known to one skilled in the art and may display pseudo-living characteristics. Typical catalyst systems and polymers are described at, for example, U.S. Pat. No. 6,699,813

Regardless of the type of polymerization process employed, a terminal functionality of the type set forth above in formulas (IIa) and (IIb) may be achieved by functionalizing the polymer prior to quenching, advantageously when it is in the polymer cement state. One method of effecting this functionalization involves introducing to the polymer cement one or more aromatic compounds that include a group capable of reacting with terminally active polymers as well as one or more hydroxyl groups or hydrolyzable protective groups (i.e., one or more OR substituents) and allowing such compound(s) to react at a terminus of a reactive polymer chain. This type of compound hereinafter is referred to as a functionalizing terminating compound.

Where the functionalizing terminating compound includes more than one OR substituents, each may be located on the same or different ring of the aryl group, as described above in relation to OR groups generally.

In one or more embodiments, the functionalizing terminating compounds comprise an aryl group having at least two directly-bonded OR groups, where each R is independently hydrogen or a hydrolyzable protective group ($R^4$, described above). In general, the aryl group may be substituted or unsubstituted, and may include a single aromatic ring or two or more fused aromatic rings. Preferably, the aryl group has at least one aromatic ring α bearing at least two directly-bonded OR groups. Preferably, the aryl group has at least one aromatic ring α bearing between two and five directly-bonded OR groups. Preferably, the aryl group has at least one aromatic ring α bearing at least two OR groups that are directly bonded to adjacent carbon atoms. More preferably, the aryl group is a phenyl group having two OR groups directly bonded at the 3 and 4 positions (which, when hydroxylated is a 3,4-dihydroxyphenyl group).

Non-limiting examples of functionalized terminating compounds include those with the following general formulas:

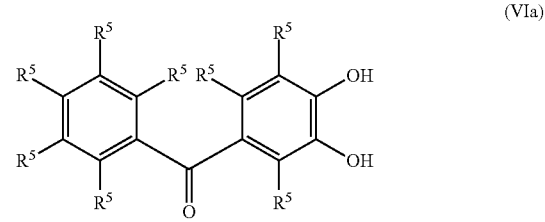

(VIa)

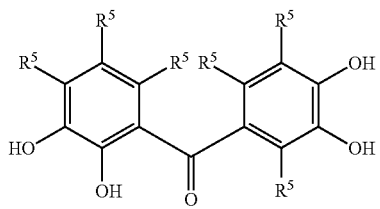 (VIb)

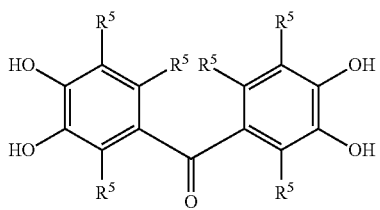 (VIc)

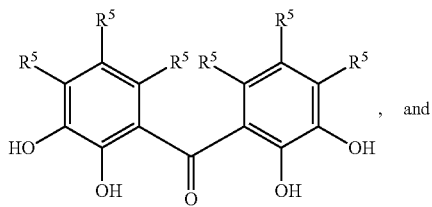 (VId), and

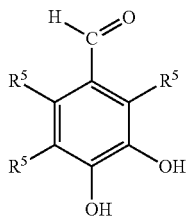 (VIe)

where each $R^5$ is independently a hydrogen, a hydroxyl group, an alkoxy group, or a hydrocarbyl group, preferably an alkyl group and more preferably a $C_1$-$C_3$ alkyl group; in certain embodiments, each $R^5$ may be hydrogen. In addition to the foregoing, two or more $R^5$ groups together can form another ring such as, for example, anthrones and flavones:

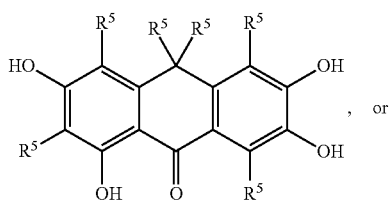 (VIIf)

, or

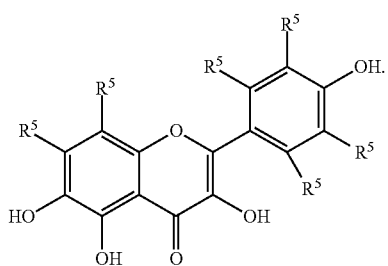 (VIIg)

By comparing formulas (VIIf) and (VIIg) to formula (IIa) above, it may be seen that $R^2$ and a portion of $R^1$ may be linked directly, or through one or more C atoms or heteroatoms, such that, together with the atom(s) to which each is bonded (directly or indirectly), they form a ring that is bound to or fused with the $R^1$ aryl group, represented by the general formula

 (IIb)

where each of the variables is defined as above.

The foregoing descriptions of ways to produce the functionalized rubbery polymer are to be considered exemplary and not limiting. For example, each of the foregoing representative compounds include adjacent hydroxyl substituent groups but, as already described, the hydroxyl substituents need not be adjacent. Not specifically shown in the foregoing formulas (VIa)-(VIg), but included within the scope of useful compounds are those having aryl groups other than phenyl groups, those having aryl groups not directly bonded to the carbonyl C atom, those with the carbonyl C atom bonded to an S atom rather than O (i.e., thioketo analogs), those where Z' is other than a single bond, and the like. Further, as suggested above, the functionalizing terminating compound itself need not include hydroxyl groups and, instead, may include easily hydrolyzable protective groups ($R^4$).

Each of the compounds represented by formulas (VIa)-(VIg) include a carbonyl group. Carbonyl groups provide convenient points for reaction with and attachment to carbanionic polymer chains. Non-limiting examples of other potentially useful reactive groups include aldehyde, (thio)ketone, (thio)ester, di(thio)ester, amide, epoxy, halosilane, and the like.

Reaction of these types of compound with a pre-made reactive polymer can be performed relatively quickly (a few minutes to a few hours) at moderate temperatures (e.g., 0° to 75° C.).

The amount of such compounds reacted with pre-made reactive polymers may vary, depending significantly on the degree of desired effect, including the desired increase in cold flow resistance, the amount of multivalent metal organic salt, and other desired effects, such as interaction between the functionalizing unit and any filler(s). Based on the amount of reactive polymer chains (generally determined based on the equivalents of initiator or catalyst), in one embodiment the amount of functional terminal compound (represented by, e.g., formulas (VIa)-(VIg) and (VII)) may range from 1:10 to 5:4, generally from 1:5 to 9:8, and typically from 1:2 to 1:1. Smaller amounts of functionalized terminating compounds may be used in one or more embodiments in order to preserve a portion of the reactive polymer terminals for reaction with other types of agents that provide functionality, which can be added before, after, or with the functionalized terminating compounds. Non-limiting examples of such other agents include compounds containing heteroatoms (including but not limited Sn, Si, and N) and those described in U.S. Pat. Nos. 3,109,871, 4,647,625, 4,677,153, 5,109,907, and 6,977,281, and references cited therein and later publications citing these patents.

Regardless whether the functionalizing unit(s) of the functionalized rubbery polymer is derived from a functionalizing initiator, functional monomer, and/or a functionalizing terminating compound, it may be desirable to hydrolyze a portion of the hydrolyzable protective groups bonded (through an oxygen atom) to the aryl group of the functionalizing units, to allow coordination interaction between the hydroxylaryl groups and the metal organic salt(s). Of the functionalizing units comprising aryl groups having at least one aromatic ring α bearing at least two directly-bonded OR groups, at least 30% of the α groups are hydrolyzed. In certain embodiments, at least 60% of the α groups are hydrolyzed. In other embodiments, at least 90% of the α groups are hydrolyzed.

The processing steps (including quenching) described below may be sufficient to hydrolyze at least a portion of the $OR^4$ moieties. Alternatively, a separate reaction step designed to promote extensive, preferably complete, hydrolysis may be employed.

Quenching may be conducted by stirring the polymer and an active hydrogen-containing compound, such as an alcohol or acid, for up to about 120 minutes at temperatures of from about 25° C. to about 150° C. Solvent may be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

In one or more embodiments, the resulting functionalized rubbery polymer may be utilized alone (i.e., as the only rubbery polymer in an elastomeric compound) or in combination with at least one additional rubbery polymer conventionally employed in applications such as tires, including but not limited to tire treads and tire sidewalls. It should be noted that in addition to containing the at least one functionalizing unit as described herein, the functionalized rubbery polymer may optionally contain additional functionalization. The at least one additional rubbery polymer, when employed, may be functionalized or non-functionalized. When the at least one additional rubbery polymer is functionalized, that functionalization may be as described in the present application or from other funtionalizers now known or in the future determined to be useful in elastomeric compositions such as for use in tires and other rubber articles. For use in the elastomeric compound, non-limiting examples of conventionally employed rubbery polymers that are useful include natural rubber and/or non-functionalized synthetic rubbers. Non-limiting examples of such synthetic rubbers include one or more polyene homo- and interpolymers (e.g., polybutadiene, polyisoprene, and copolymers incorporating butadiene, isoprene, and the like), styrene-butadiene rubber, butyl rubber, neoprene, ethylene-propylene rubber, EPDM, nitrile rubber, silicone rubber, fluoroelastomers, ethylene-acrylic rubber, ethylene-vinyl acetate rubber, epichlorohydrin rubbers, chlorinated polyethylene rubbers, chlorosulfonated polyethylene rubbers, hydrogenated nitrile rubber, tetrafluoroethylene-propylene rubber and the like.

When functionalized rubbery polymer(s) is blended with at least one additional rubbery polymer, the amounts of the functionalized rubbery polymer(s) may vary from 10 to 100 wt % of the total rubber (i.e., 10-100 phr), with the at least one additional rubbery polymer(s) making up the balance of the total rubber. The minimum amount depends to a significant extent on the degree of cold flow resistance desired, as well as other properties desired (including but not limited to hysteresis reduction).

Depending on the application and on the density of the filler particles, elastomeric compounds may be filled to an amount of between 0-300 phr. In one or more embodiments, elastomeric compounds may be filled with between 5-200 phr of filler. Typically, (combined) amounts of fillers are between 30-160 phr; in other embodiments, between 40-120 phr.

Generally, any filler conventionally used to prepare elastomeric compositions such as for tires and other uses may be used herein. Potentially useful fillers include carbon black, fumed or precipitated silica, clay, metal oxide, metal hydroxide, metal sulfide, metal silicate, metal carbonate, dual phase or multi-phase composite particles, or combinations thereof. Other potentially useful fillers are disclosed in e.g., WO 2009086490.

Other conventional rubber additives also can be added. These include, for example, process oils, plasticizers, anti-degradants such as antioxidants and antiozonants, curing agents and the like.

When forming the elastomeric composition, generally all ingredients can be mixed with standard equipment such as, e.g., Banbury or Brabender mixers. Typically, mixing occurs in two or more stages. During the first stage (also known as the masterbatch stage), mixing typically is begun at temperatures of ~100° to ~130° C. and increases until a so-called drop temperature, typically ~165° C., is reached.

Where a formulation includes fillers other than carbon black, a separate re-mill stage often is employed for separate addition of the, e.g., silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, Encyclopedia of Chem. Tech., 3d ed., (Wiley Interscience, New York, 1982), vol. 20, pp. 365-468. Vulcanizing agents, accelerators, etc., are added at a final mixing stage. To avoid undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The embodiments disclosed herein will be more readily understood by reference to the following examples. There are, of course, many other embodiments or illustrations which will become apparent to one skilled in the art, and it will accordingly be recognized that these examples are given for the purpose of illustration only, and are not to be construed as limiting the scope of the claims in any way.

EXAMPLES

Molecular weights were measured by gel permeation/size exclusion chromatography (SEC) using a Waters GPC system. Molecular weights were calculated using the following Mark-Houwink parameters: K=0.000269, α=0.73 for SBR; K=0.000166, α=0.79 for high-cis BR.

All nuclear magnetic resonance (NMR) testing was performed on a Varian™ 300 MHz spectrometer (Varian, Inc.; Palo Alto, Calif.). Cold flow testing was performed using a Williams' Parallel Plate Plastometer (from Scott™ Testers, Inc.) at room temperature. Samples were prepared by melt pressing 2.5 g of polymer at 100° C. under high pressure for 20 minutes in a mold using a preheated press. The resulting cylindrical samples, which had a uniform height of 12.5 mm and a uniform diameter of 14.0 mm, were allowed to cool to room temperature before being removed from the mold. Samples were placed individually into the plastometer under the weight of a 5 kg calibrated weight. Tests were conducted for ~30 min. for SBR samples (measured from time that the weight was released onto the sample), with sample height being recorded as a function of time. Sample height at the conclusion of the appropriate time (~30 min.) generally is considered to be an acceptable indicator of cold flow resistance, with a higher value of this final height indicating a better cold flow resistance for the polymer.

Mooney viscosity (ML1+4) values were determined with an Alpha Technologies Mooney viscometer (with a large rotor) using a one-minute warm-up time and a four-minute running time.

The glass transition temperature was determined using a DSC Q2000 Differential Scanning calorimeter (TA Instruments) at a heating rate of 10° C./min. The Tg was determined as the temperature where an inflection point occurred in the heat capacity (Cp) change.

Viscoelastic properties of cured rubber compounds were measured with an Advanced Rheometric Expansion System (ARES) from TA Instruments. The dynamic strain sweep testing was carried out in the parallel plate geometry with a rubber button of 7.8 mm in diameter and 6.0 mm in height. The loss modulus, G", storage modulus, G', and hysteresis tan δ were measured over deformation of 0.10-25.0% $\gamma_0$ (strain amplitude) at 15 Hz and 50° C. The dynamic temperature step testing was performed in the torsion rectangular geometry with samples having the dimensions 47.0 mm×12.7 mm×2.0 mm. The temperature was increased stepwise from −60° C. to 100° C. The moduli (G' and G") were obtained using a frequency of 10 Hz and a deformation of 0.5% $\gamma_0$ from −60° C. to −8° C. and 2.92% $\gamma_0$ from −7° C. to 100° C.

Tensile mechanical properties were determined using the standard procedure described in ASTM-D412. With respect to tensile properties, "Mod Y %" is engineering stress at Y % elongation, $T_b$ is tensile strength at break, and $E_b$ is percent elongation at break.

Cure was tested at 171° C. with a Monsanto rheometer MDR 2000 from Alpha Technologies.

Example 1—Cold Flow Testing for SBR Samples Containing 1.0 phr of Iron (III) Acetylacetonate $Fe(C_5H_7O_2)_3$ The following polymer solutions were prepared separately: 10.0 grams of non-modified styrene-butadiene rubber (SBR) (Control 1) in about 50 grams of toluene and 10.0 grams of SBR terminated with 3,4-dihydroxybenzaldehyde (SBR-DOBA, Experimental 1) in about 50 grams of toluene. Relevant information on the two polymers is listed in Table 1, below.

TABLE 1

|  | Control 1 | Experimental 1 |
|---|---|---|
| GPC |  |  |
| Mn | 113,653 | 134,815 |
| Mw | 117,523 | 147,831 |
| Mp | 117,431 | 134,745 |
| Mw/Mn | 1.034 | 1.096 |

TABLE 1-continued

|  | Control 1 | Experimental 1 |
|---|---|---|
| NMR |  |  |
| % bound sty | 20.9 | 21.7 |
| % vinyl (Bd = 100) | 55.5 | 56.8 |
| DSC |  |  |
| Mid-point Tg (C.) | −32.9 | −31.7 |

Two bottles of metal salt solutions were also prepared separately, each containing 0.10 grams of iron (III) acetylacetonate in about 10 grams of toluene. One of the metal salt solutions was poured into the solution of the control SBR while the other was poured into the solution of SBR-DOBA. To facilitate dissolution of either polymer or metal salt into the solvent, or uniform dispersion of metal salt solution into polymer solution, the container can be placed onto a shaker for agitation at room temperature. Each polymer solution containing the dissolved iron (III) acetylacetonate was then poured into a pan for air-drying. After evaporation of most of the solvent, the polymers were dried further in a vacuum oven heated to about 60° C. overnight. The dried polymers were then subjected to cold flow resistance testing with a Scott Tester (plastometer). Testing results are listed in Table 2 (and shown in the accompanying FIGURE), below, for both original polymer samples containing no metal salt and the polymer samples containing 1.0 phr of iron (III) acetylacetonate.

TABLE 2

(Cold Flow Test with Scott Tester)

|  | Final height (mm) (from Scott tester at RT) | |
|---|---|---|
| Amount of Fe (III) acetylacetonate (phr) | SBR control | SBR-DOBA |
| 0.0 | 2.146 | 3.390 |
| 1.0 | 2.204 | 5.253 |

For the control SBR, the 1.0 phr of iron (III) acetylacetonate generated essentially no effect on cold flow resistance, as evidenced by the fact that the final height of the control SBR samples with and without iron (III) acetylacetonate are essentially identical. In contrast, the cold flow resistance for SBR-DOBA containing 1.0 phr of iron (III) acetylacetonate ("SBR-DOBA/Fe(III) sample) was significantly enhanced. And, in comparison to the SBR-DOBA control sample (i.e., sample without iron (III) acetylacetonate), the SBR-DOBA/Fe(III) sample exhibited 55% increase in final height at the end of cold flow testing at room temperature. The variation of the specimen height with time during the cold flow testing is displayed in the plot of FIG. 1 for the four polymers.

Example 2—Cold Flow Testing for SBR-DOBA Samples Containing 0.7425 phr of Iron (III) Acetylacetonate $Fe(C_5H_7O_2)_3$ or 0.6821 phr of Aluminum (III) Acetylacetonate $Al(C_5H_7O_2)_3$ Two bottle of polymer solutions were prepared, each containing: 55.0 grams of SBR terminated with 3,4-dihydroxybenzaldehyde (SBR-DOBA2, Experimental 2) in about 408 grams of toluene. Relevant information on the polymer is listed in Table 3 below.

TABLE 3

|  | Experimental 2 |
| --- | --- |
| GPC | |
| Mn | 118,479 |
| Mw | 134,447 |
| Mp | 114,168 |
| Mw/Mn | 1.135 |
| NMR | |
| % bound styrene | 19.4 |
| % vinyl (Bd = 100) | 55.0 |
| DSC | |
| Mid-point Tg (C.) | −37.3 |

Two bottles of metal salt solutions were also prepared separately: one containing 0.4086 g of iron (III) acetylacetonate in about 36 g of toluene and the other containing 0.3753 g of aluminum (III) acetylacetonate in about 28 g of toluene. Each bottle of metal salt solution was then mixed thoroughly into one of the two polymer solutions (containing SBR-DOBA2). Each polymer solution containing one dissolved metal salt was then poured into a separate pan for air-drying. After evaporation of most of the solvent, the polymers were dried further in a vacuum oven heated to about 60° C. overnight. The dried polymers were then subjected to cold flow resistance testing with a Scott Tester. The final specimen height from the cold flow testing is listed in Table 4 below for both the original polymer containing no metal salt and the two samples containing metal salt.

TABLE 4

| Sample | SBR-DOBA2 | SBR-DOBA2/Fe(III) | SBR-DOBA2/Al(III) |
| --- | --- | --- | --- |
| Metal salt | N/A | Fe(III) acetylacetonate | Al (III) acetylacetonate |
| Salt amount (phr) | 0 | 0.7425 | 0.6821 |
| Cold flow h (mm) | 3.114 | 4.555 | 4.815 |

As shown, both SBR-DOBA2 samples containing organic metal salt (aluminum (III) acetylacetonate and iron (III) acetylacetonate) resulted in more than a 5% increase in final height from testing of cold flow resistance as compared to the SBR-DOBA2 control sample. More specifically, the SBR-DOBA2/Fe(III) sample had a final height of 4.555 mm, which is 46% higher than that for the control sample (i.e., SBR-DOBA2 without any multivalent organic salt). The SBR-DOBA2/Al(III) sample had a final height of 4.815 mm, which is 55% higher than that for the control sample.

Example 3—(Compounding Study)—All Carbon Black Formulation

The dried samples of SBR-DOBA2 prepared in Example 2 (containing either aluminum (III) acetylacetonate or iron (III) acetylacetonate) and a dried SBR-DOBA2 sample without metal organic salt were then compounded using a 65-gram Brabender internal mixer. The carbon black-filled formulation that resulted is shown in Table 5 below, where all amounts are in phr. Both the comparative and the experimental compounds are filled with 50 phr of carbon black of grade N343.

TABLE 5

| | Formulation | Comparative 2 | Experimental 3 | Experimental 4 |
| --- | --- | --- | --- | --- |
| MB | SBR-DOBA2 | original | w Fe 3+ | w Al3+ |
| | amount | 100 | 100.74 | 100.68 |
| | C/B N343 | 50 | 50 | 50 |
| | Black Oil | 10 | 10 | 10 |
| | Stearic Acid | 2 | 2 | 2 |
| | Wax Blend | 2 | 2 | 2 |
| | AntiOxidant[1] | 0.95 | 0.95 | 0.95 |
| FB | ZnO | 2.5 | 2.5 | 2.5 |
| | DPG[2] | 0.3 | 0.3 | 0.3 |
| | MBTS[3] | 0.5 | 0.5 | 0.5 |
| | TBBS[4] | 0.5 | 0.5 | 0.5 |
| | S | 1.5 | 1.5 | 1.5 |

[1]N-(1,3-Dimethylbutyl)-N'-phenyl-pphenylenediamine
[2]Diphenyl guanidine
[3]2,2'-Dithiobis(benzothiazole)
[4]N-tert-Butyl-2-benzothiazolesulfenamide Two stages of mixing (master batch and final batch) were carried out for each compound, as indicated in Table 5. After vulcanization under high pressure at high temperature, physical properties of the compounds were tested with proper instruments and are summarized in Table 6 below.

TABLE 6

| | Stk# | | |
| --- | --- | --- | --- |
| | 1 | 2 | 3 |
| Metal salt in SBR-DOBA2 | N/A | Fe(III) acetylacetonate | Al(III) acetylacetonate |
| Salt amount (phr) | 0 | 0.7425 | 0.6821 |
| ML 1 + 4 at 130 C. | 34.3 | 43.9 | 48.2 |
| Cure test at 171 C. 30 min | | | |
| ML DN · m | 1.04 | 1.28 | 1.311 |
| MH DN · m | 17.15 | 15.12 | 14.91 |
| I'50 min | 1.59 | 1.52 | 1.54 |
| I'90 min | 9.02 | 11.05 | 12.15 |
| Micro-dumbell (at RT) | | | |
| Mod50% (MPa) | 1.714 | 1.533 | 1.535 |
| Mod300% (MPa) | 13.85 | 12.36 | 11.85 |
| Tb (MPa) | 18.1 | 18.0 | 17 |
| Eb % | 375.0 | 407.2 | 403.5 |
| Temp Swp 10 Hz | | | |
| T at peak tanδ (C.) | −18.0 | −18.1 | −17.8 |
| tanδ at peak | 0.9074 | 0.9405 | 0.9616 |
| G' 2.92% 60 C. (MPa) | 4.06 | 3.94 | 3.57 |
| tanδ 2.92% 60 C. | 0.175 | 0.163 | 0.168 |
| Strain Swp 50 C. & 15 Hz | | | |
| G' at 12.5% (MPa) | 2.18 | 2.17 | 2.13 |
| tanδ at 12.5% | 0.138 | 0.146 | 0.147 |

The Mooney viscosity for the compounds made of SBR-DOBA2 containing a small amount of either aluminum (III) acetylacetonate or iron (III) acetylacetonate is higher, as expected. In comparison to the compound made of the original SBR-DOBA2 containing no metal salt, rolling loss as indicated with tan δ at 50° C. & 15 Hz becomes only slightly higher for the compounds made of SBR-DOBA2 containing a small amount of metal salt.

Example 4—Comparison Testing of Iron (II) Acetylacetonate $Fe(C_5H_7O_2)_2$ and Monohydroxyphenyl Group The following polymer solutions in toluene were prepared separately following a procedure similar to that described previously: non-modified SBR (Comparative 3); SBR terminated with 4-monohydroxybenzaldehyde (SBR-4(OH) BA, Comparative 4); deprotected SBR initiated with lithiated 3,4-di(tertbutyldimethylsiloxy) styrene and terminated with 3,4-di(tertbutyldimethylsiloxyl)benzaldehyde (DOB-SBR-3,4-DOBA, Experimental 5); and SBR terminated with 3,4-dihydroxybenzaldehyde (SBR-3,4-DOBA, Experimental 6). Relevant information on the polymers is listed in Table 7, below.

TABLE 7

| | Comparative 3 | Comparative 4 | Experimental 5 | Experimental 6 |
|---|---|---|---|---|
| Polymer ID | SBR-H | SBR-4 (OH)BA | DOB-SBR-3,4 DOBA | SBR-3,4 DOBA |
| GPC | | | | |
| Mn | 144,071 | 117,864 | 210,632 | 115,732 |
| Mw | 152,460 | 122,327 | 1,029,700 | 126,217 |
| Mp | 153,249 | 122,315 | 187,989 | 113,247 |
| Mw/Mn | 1.058 | 1.038 | 4.889 | 1.091 |
| NMR | | | | |
| % bound styrene | ~33 | ~20 | ~33 | ~20 |
| % vinyl (Bd = 100) | ~31 | ~55 | ~31 | ~55 |
| DSC | | | | |
| Mid-point Tg (C) | −43.4 | −36.5 | −42.8 | −35.6 |

Five bottles of iron (III) acetylacetonate solutions were also prepared separately. Each bottle was then mixed thoroughly into Comparative 4 (SBR-4 (OH)BA) or Experimental 6 (SBR-3,4 DOBA) samples in amounts sufficient to provide a series of samples containing the metal salts at levels varying between 0 phr and 1.0 phr, as described in Table 8 below. As before, each polymer solution containing one dissolved metal salt was then poured into a separate pan for air-drying. After evaporation of most of the solvent, the polymers were dried further in a vacuum oven heated to about 60° C. overnight. The dried polymers were then subjected to cold flow resistance testing with a Scott Tester. The final specimen heights from the cold flow testing are listed in Table 8.

TABLE 8

| Amount of | Final height (mm) (from Scott tester at RT) | |
|---|---|---|
| Fe (III) acetylacetonate (phr) | SBR-4 (OH)BA | SBR-3,4 DOBA |
| 0.0 | 2.322 | 2.978 |
| 0.2 | N/A | 5.694 |
| 0.4 | N/A | 5.308 |
| 0.5 | 2.376 | N/A |
| 0.8 | N/A | 5.223 |
| 1.0 | 2.324 | N/A |

Results show that no effect on cold flow resistance from metal salt was detected for SBR terminated with 4-monohydroxybenzaldehyde. And, beyond a certain threshold amount of metal salt, it is seen that the addition of more metal salt will not further enhance cold flow resistance for SBR terminated with 3,4-dihydroxybenzaldehyde.

Two bottles of iron (II) acetylacetonate solutions and three bottles of iron (III) acetylacetonate solutions were also prepared separately. Each bottle of metal salt solution was then mixed with one bottle of the Experimental 5 sample solution, as listed below in Table 9, to allow direct comparison of the effectiveness of the two metal salt solutions. Each polymer solution was mixed with metal salt and dried as before. The dried polymers were then subjected to cold flow resistance testing with a Scott Tester. The final specimen heights from the cold flow testing are listed in Table 9.

TABLE 9

| | Final height (mm) (from Scott tester at RT) | |
|---|---|---|
| Amount of metal salt (phr) | SBR-H | DOB-SBR-3,4 DOBA |
| 0.0 | 2.81 | 7.76 |
| 0.0629 phr Fe(III)(ACAC)$_3$ | N/A | 8.72 |
| 0.1258 phr Fe(III)(ACAC)$_3$ | N/A | 9.16 |
| 0.0678 phr Fe(II)(ACAC)$_2$ | N/A | 8.72 |
| 0.0629 phr Fe(III) + 0.0678 phr Fe(II) | N/A | 8.95 |

It may be seen that, besides Fe3+, divalent Fe2+ may also significantly enhance cold flow resistance for SBR terminated with 3,4-dihydroxybenzaldehyde.

Example 5—Examples of High-Cis BR (Prepared with a Neodymium Catalyst System)

Catalyst was prepared by adding 1.6 g butadiene (21.4 wt. % in hexanes) to a dried, capped, $N_2$-flushed bottle, together with the following commercially available reagents and starting materials, all of which are obtained from Sigma-Aldrich Co. (St. Louis, Mo.) and used without further purification: 5.15 mL methylaluminoxane (MAO) (1.5 M); 5.15 mL neodymium versatate (0.050 M); 5.4 mL diisobutylaluminum hydride (1.0 M); and 1.03 mL diethylaluminum chloride (1.0 M). The mixture was aged for 15 minutes at room temperature prior to use in the following polymerizations.

To a $N_2$-purged reactor equipped with a stirrer was added 1.22 kg hexane and 2.86 kg butadiene solution (21.4% by wt. in hexane). The reactor was charged with the catalyst mixture, and the jacket temperature was set to 60° C. The polymerization was allowed to continue for ~60 minutes and thereafter 0.5 M 4,4'-bis(diethylamino)benzophenone (DEAB) in toluene (1.25 mL per 100 g polymer cement) was added and allowed to react for an additional ~30 minutes. The polymer cement was then cooled to room temperature and thereafter quenched in isopropanol containing 2,6-di-tert-butyl-4-methylphenol and then drum dried. This is designated Comparative 5, below.

The polymerization was essentially repeated, with the exception that, prior to quenching, 3,4-di(tert-butyldimethylsiloxyl)benzaldehyde (3,4-DOBA) was added and allowed to react instead of DEAB. This is designated Experimental 7, below. Relevant information on the polymers is listed in Table 10.

TABLE 10

|  | Comparative 5 | Experimental 7 |
| --- | --- | --- |
| Polymer | cis BR-DEAB | cis BR-3,4 DOBA |
| GPC |  |  |
| Mn | 117,355 | 120,469 |
| Mw | 253,875 | 270,662 |
| Mp | 212,309 | 220,178 |
| Mw/Mn | 2.163 | 2.247 |

Two bottles of iron (III) acetylacetonate solution were prepared separately. Each bottle was then mixed thoroughly into Comparative 5 or Experimental 7 samples in amounts sufficient to provide a series of samples containing the metal salts at levels varying between 0 phr and 1.0 phr, as described in Table 11 below. As before, each polymer solution containing one dissolved metal salt was then poured into a separate pan for air-drying. After evaporation of most of the solvent, the polymers were dried further in a vacuum oven heated to about 60° C. overnight. The dried polymers were then subjected to cold flow resistance testing with a Scott Tester. The final specimen heights from the cold flow testing are listed in Table 11.

TABLE 11

| Amount of | Final height (mm) (from Scott tester at RT) | |
| --- | --- | --- |
| Fe (III) acetylacetonate (phr) | cis BR-DEAB | cis BR-3,4 DOBA |
| 0.0 | 1.986 | 2.719 |
| 0.2 | 2.048 | 3.247 |
| 1.0 | 2.029 | 3.108 |

As shown, for cis-BR terminated with DEAB, cold flow resistance is not affected by the molecularly dispersed organic metal salt. In contrast, cold flow resistance is significantly enhanced with $Fe^{3+}$ for cis-BR terminated with 3,4-DOBA.

Example 6—Different Functional Group or Different Metal Ion

The following polymer solutions in toluene were prepared separately following a procedure similar to that described previously: SBR terminated with aminopropylmethylethoxysilane (SBR-APMDEOS, Comparative 6); SBR with six units of 3,4-dihydroxystyrene randomly distributed along the backbone and terminated with APMDEOS (SBR-co-DOB(6)-APMDEOS, Experimental 8); SBR terminated with 2,4,5-trihydroxybenzaldehyde (SBR-2,4,5 TOBA, Experimental 9); SBR terminated with 3,4-dihydroxybenzonitrile (SBR-DOBN, Experimental 10); and SBR terminated with 3,4-dihydroxybenzaldehyde (SBR-DOBA, Experimental 11). Relevant information on the polymers is listed in Table 12 below.

TABLE 12

|  | Comparative 6 | Experimental 8 | Experimental 9 | Experimental 10 | Experimental 11 |
| --- | --- | --- | --- | --- | --- |
| Polymer | SBR-APMDEOS | SBR-co-DOB(6)-APMDEOS | SBR-2,4,5 TOBA | SBR-DOBN | SBR-DOBA |
| GPC |  |  |  |  |  |
| Mw (kg/mol) | 109.2 | 280.2 | 273.3 | 169.4 | 123.4 |
| Mw/Mn | 1.043 | 1.817 | 1.571 | 1.276 | 1.176 |
| Mp (kg/mol) | 109.9 | 138.8 | 128 | 121.3 | 99.2 |
| DSC |  |  |  |  |  |
| Mid-point Tg (C.°) | −36.7 | −34.9 | −33.7 | −38.8 | −36.5 |

Solutions of zirconium (IV) acetylacetonate (in toluene), calcium (II) acetylacetonate (in THF), and iron (II) acetylacetonate (in toluene) were also prepared separately. Each salt solution was then mixed thoroughly with one polymer solution. As before, each mixture containing one dissolved metal salt was then poured into a separate pan for air-drying. After evaporation of most of the solvent, the polymers were dried further in a vacuum oven heated to about 60° C. overnight. The dried polymers were then subjected to cold flow resistance testing with a Scott Tester. The final specimen heights from the cold flow testing are listed in Table 13. It is noted here that the solution of SBR-co-DOB(6)-APMDEOS containing 1.603 phr of zirconium (IV) acetylacetonate became thick and gel-like while the solution of SBR-APMDEOS containing 1.611 phr of zirconium (IV) acetylacetonate remained fluid-like.

TABLE 13

Final height (mm) (from Scott tester at RT)

| Polymer | SBR-APMDEOS | SBR-co-DOB(6)-APMDEOS | SBR-2,4,5 TOBA | SBR-DOBN | SBR-DOBA |
|---|---|---|---|---|---|
| 1) Final height w/o salt (mm) | 2.164 | 8.526 | 5.941 | 4.724 | 2.9 |
| 2) amount of Zr (IV) acetylacetonate (phr) | 1.611 | 1.603 | 0.415 | 0.403 | 0.41 |
| Final height (mm) | 2.425 | 10.789 | 7.929 | 6.083 | 3.827 |
| 3) amount of Ca (II) acetylacetonate (phr) | N/A | N/A | N/A | N/A | 0.405 |
| Final height (mm) | N/A | N/A | N/A | N/A | 3.5 |
| 4) amount of Fe (II) acetylacetonate (phr) | N/A | N/A | N/A | N/A | 0.403 |
| Final height (mm) | N/A | N/A | N/A | N/A | 3.624 |

The above results show that only minor change in cold flow resistance occurred for SBR-APMDEOS mixed with 1.611 phr of zirconium (IV) acetylacetonate. In contrast, significant enhancement in cold flow resistance was detected for all other combinations of functional group and metal ion.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. An elastomeric composition comprising:
   (a) from 10 to 100 phr of a rubbery polymer having at least one functionalized terminus with functionality comprising a functionalizing terminating compound comprising an aryl group having at least one aromatic ring, and the at least one aromatic ring bears at least two directly-bonded —OR groups, where R is hydrogen or a hydrolyzable protecting group, with the proviso that at least 30% of the —OR groups are hydrolyzed;
   (b) at least 0.01 phr of a multivalent metal organic salt; and
   (c) from 0 to 90 phr of at least one additional rubbery polymer, wherein the rubbery polymer having at least one functionalized terminus contains monomers selected from conjugated diene compounds optionally in combination with monomers selected from vinyl aromatic compounds.

2. The elastomeric composition as claimed in claim 1, wherein the at least one additional rubbery polymer of (c) is selected from the group consisting of natural rubber, polybutadiene, polyisoprene, styrene-butadiene rubber, butyl rubber, neoprene, ethylene-propylene rubber, EPDM, nitrile rubber, silicone rubber, fluoroelastomers, ethylene-acrylic rubber, ethylene-vinyl acetate rubber, epichlorohydrin rubber, chlorinated polyethylene rubber, chlorosulfonated polyethylene rubber, hydrogenated nitrile rubber, tetrafluoroethylenepropylene rubber, and combinations thereof.

3. The elastomeric composition as claimed in claim 1, where the at least one aromatic ring bears between two and five directly-bonded —OR groups.

4. The elastomeric composition as claimed in claim 1, where at least two —OR groups are directly bonded to adjacent carbon atoms.

5. The elastomeric composition as claimed in claim 1, where $R^1$ is derived from dihydroxybenzaldehyde.

6. The elastomeric composition as claimed in claim 1, where the multivalent metal organic salt is selected from the group of salts consisting of $Fe^{2+}$, $Fe^{3+}$, $Al^{3+}$, $Ca^{2+}$, $Mn^{2+}$, $Mn^{3+}$, Mn4+, $Mn^{7+}$, $Co^{2+}$, $Ni^{2+}$, $Zn^{2+}$, $Cu^{2+}$, $Ga^{3+}$, $Zr^{4+}$, $Ti^{3+}$, $Ti^{4+}$, $Mg^{2+}$, $Cr^{2+}$, $Cr^{3+}$, $Cr^{6+}$, $V^{3+}$, $V^{4+}$, $V^{5+}$, $Sn^{2+}$, $Sn^{4+}$, $Pt^{2+}$, and combinations thereof.

7. The elastomeric composition as claimed in claim 1, further comprising at least one filler selected from the group consisting of carbon black, fumed or precipitated silica, clay, metal oxide, metal hydroxide, metal sulfide, metal silicate, metal carbonate, dual phase or multi-phase composite particles, and combinations thereof.

8. The elastomeric composition as claimed in claim 1, where the multivalent metal organic salt is present in an amount of 0.1 phr to 10 phr.

9. A tire having at least one component comprised of the elastomeric composition as claimed in claim 1.

10. An elastomeric composition comprising:
(a) from 10 to 100 phr of a rubbery polymer having at least one functionalized terminus with functionality comprising a functionalizing terminating compound comprising an aryl group having at least one aromatic ring, and the at least one aromatic ring bears at least two directly-bonded —OR groups, where R is hydrogen or a hydrolyzable protecting group, with the proviso that at least 30% of the —OR groups are hydrolyzed;
(b) from 0.01 phr to 10 phr of a multivalent metal organic salt;
(c) from 0 to 90 phr of at least one additional rubbery polymer selected from natural rubber, polybutadiene, polyisoprene, styrene-butadiene rubber, butyl rubber, neoprene, ethylene-propylene rubber, EPDM, nitrile rubber, silicone rubber, fluoroelastomers, ethylene-acrylic rubber, ethylene-vinyl acetate rubber, epichlorohydrin rubber, chlorinated polyethylene rubber, chlorosulfonated polyethylene rubber, hydrogenated nitrile rubber, or tetrafluoroethylenepropylene rubber; and
(d) from 5 to 200 phr of at least one filler selected from carbon black, fumed or precipitated silica, clay, metal oxide, metal hydroxide, metal sulfide, metal silicate, or metal carbonate,
wherein the rubbery polymer having at least one functionalized terminus contains monomers selected from conjugated diene compounds optionally in combination with monomers selected from vinyl aromatic compounds.

11. The elastomeric composition as claimed in claim 10, where the at least one aromatic ring bears between two and five directly-bonded —OR groups.

12. The elastomeric composition as claimed in claim 10, where the at least one aromatic ring bears at least two —OR groups that are directly bonded to adjacent carbon atoms.

13. The elastomeric composition as claimed in claim 10, where the functionalizing unit is derived from dihydroxybenzaldehyde.

14. The elastomeric composition as claimed in claim 10, where the multivalent metal organic salt is selected from the group of salts consisting of $Fe^{2+}$, $Fe^{3+}$, $Al^{3+}$, $Ca^{2+}$, $Mn^{2+}$, $Mn^{3+}$, $Mn4+$, $Mn^{7+}$, $Co^{2+}$, $Ni^{2+}$, $Zn^{2+}$, $Cu^{2+}$, $Ga^{3+}$, $Zr^{4+}$, $Ti^{3+}$, $Ti^{4+}$, $Mg^{2+}$, $Cr^{2+}$, $Cr^{3+}$, $Cr^{6+}$, $V^{3+}$, $V^{4+}$, $V^{5+}$, $Sn^{2+}$, $Sn^{4+}$, $Pt^{2+}$, and combinations thereof.

15. An elastomeric composition comprising:
(a) from 10 to 100 phr of a rubbery polymer having at least one functionalized terminus with functionality comprising a functionalizing terminating compound comprising an aryl group having at least one aromatic ring, and the at least one aromatic ring bears at least two directly-bonded —OR groups, where R is hydrogen or a hydrolyzable protecting group, with the proviso that at least 30% of the —OR groups are hydrolyzed,
(b) at least 0.01 phr of a multivalent metal organic salt;
(c) from 0 to 90 phr of at least one additional rubbery polymer; and
(d) from 5 to 200 phr of at least one filler selected from carbon black, fumed or precipitated silica, clay, metal oxide, metal hydroxide, metal sulfide, metal silicate, or metal carbonate,
wherein the rubbery polymer having at least one functionalized terminus contains monomers selected from conjugated diene compounds optionally in combination with monomers selected from vinyl aromatic compounds.

16. The elastomeric composition as claimed in claim 15, wherein the at least one additional rubbery polymer of (c) is selected from the group consisting of natural rubber, polybutadiene, polyisoprene, styrene-butadiene rubber, butyl rubber, neoprene, ethylene-propylene rubber, EPDM, nitrile rubber, silicone rubber, fluoroelastomers, ethylene-acrylic rubber, ethylene-vinyl acetate rubber, epichlorohydrin rubber, chlorinated polyethylene rubber, chlorosulfonated polyethylene rubber, hydrogenated nitrile rubber, tetrafluoroethylenepropylene rubber, and combinations thereof.

17. The elastomeric composition as claimed in claim 15, where the at least one aromatic ring bears between two and five directly-bonded —OR groups.

18. The elastomeric composition as claimed in claim 15, where at least two —OR groups are directly bonded to adjacent carbon atoms.

19. The elastomeric composition as claimed in claim 15, where the multivalent metal organic salt is present in an amount of 0.1 phr to 10 phr.

* * * * *